(12) United States Patent
Goy et al.

(10) Patent No.: US 11,971,040 B2
(45) Date of Patent: Apr. 30, 2024

(54) AIRCRAFT FUEL SYSTEM WITH CLUTCHED AUGMENTOR PUMP

(71) Applicant: Hamilton Sundstrand Corporation, Charlotte, NC (US)

(72) Inventors: Edward W. Goy, Crystal Lake, IL (US); Michael R. Blewett, Stillman Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 121 days.

(21) Appl. No.: 17/509,996

(22) Filed: Oct. 25, 2021

(65) Prior Publication Data

US 2023/0132118 A1 Apr. 27, 2023

(51) Int. Cl.
*F02C 7/22* (2006.01)
*F04D 13/02* (2006.01)
*F04D 13/14* (2006.01)

(52) U.S. Cl.
CPC .......... *F04D 13/14* (2013.01); *F04D 13/021* (2013.01); *F05D 2220/32* (2013.01); *F05D 2240/515* (2013.01); *F05D 2240/55* (2013.01)

(58) Field of Classification Search
CPC .... F02C 7/14; F02C 7/22; F02C 7/236; F02C 7/224; F02C 7/32; F04D 13/14; F05D 2240/55
See application file for complete search history.

(56) References Cited

U.S. PATENT DOCUMENTS

| | | | |
|---|---|---|---|
| 2,774,215 A | 12/1956 | Mock et al. | |
| 3,011,308 A | 12/1961 | Wotring | |
| 4,104,873 A * | 8/1978 | Coffinberry | F02C 7/14 60/39.83 |
| 4,120,603 A | 10/1978 | Downing | |
| 4,205,945 A * | 6/1980 | Davis | F02C 7/236 417/323 |
| 6,401,446 B1 * | 6/2002 | Gibbons | F02C 9/38 60/734 |
| 2016/0146108 A1 * | 5/2016 | Yates | F02C 7/236 415/124.1 |
| 2020/0300169 A1 * | 9/2020 | Turney | F02C 7/32 |

FOREIGN PATENT DOCUMENTS

| | | |
|---|---|---|
| EP | 3712410 A1 | 9/2020 |
| EP | 3851654 A1 | 7/2021 |

OTHER PUBLICATIONS

Extended European Search Report dated Mar. 2, 2023, issued during the prosecution of European Patent Application No. EP 22203625.3.

* cited by examiner

*Primary Examiner* — Brian P Wolcott
*Assistant Examiner* — Maxime M Adjagbe
(74) *Attorney, Agent, or Firm* — Kinney & Lange, P. A.

(57) ABSTRACT

A fuel system is disclosed for a gas turbine engine, which includes an augmentor pump having an inlet communicating with a fuel supply source and a discharge communicating with an augmentation stage of the engine, wherein the augmentor pump is connected to an accessory drive gearbox mounted to the engine, and a high speed clutch for selectively engaging and disengaging the augmentor pump and the accessory drive gearbox.

20 Claims, 1 Drawing Sheet

AIRCRAFT FUEL SYSTEM WITH CLUTCHED AUGMENTOR PUMP

BACKGROUND OF THE DISCLOSURE

1. Field of the Disclosure

The subject disclosure is directed to a fuel system for aircraft, and more particularly, to a fuel supply system for aircraft that includes a high speed clutch for engaging and disengaging an augmentor pump from the engine gearbox.

2. Description of Related Art

Afterburners or thrust augmentors are known in the art for increasing the thrust output of a gas turbine engine during flight operations. Additional thrust is produced within an augmentor when oxygen contained within the core gas flow of the engine is mixed with fuel and burned.

Current augmentor fuel pumping systems are driven off the engine gearbox and require inlet shutoff valves, which provide restrictions at the inlet of the pumping element that limit suction capabilities. Additionally, the pump element will continue to rotate even when it is dry, which can lead to unnecessary wear over time. Boost pumps are typically sized to provide flow to the main stage and the augmentor stage, and thus provide excess pressure and flow when the augmentor pump is off.

It would be beneficial to provide a system where the augmentor pump can be turned off when not needed to provide thermal benefits to the system. The main boost stage for the fuel system could be reduced in size by incorporating an inducer on the augmentor impellor, which would be sized to provide suction capabilities from the fuel tank. A smaller boost stage will improve thermal input and lower weight of the system.

SUMMARY OF THE DISCLOSURE

The subject disclosure is directed to a fuel system for a gas turbine engine that includes an augmentor pump having an inlet communicating with a fuel supply source and a discharge communicating with an augmentation stage of the engine, wherein the augmentor pump is connected to an accessory drive gearbox mounted to the engine, and a high speed clutch for selectively engaging and disengaging the augmentor pump and the accessory drive gearbox. Preferably, the augmentor pump is a centrifugal pump. It is envisioned that the high speed clutch can be electro-magnetically actuated or it can be hydraulically actuated.

In one embodiment, the fuel supply source is a boost stage pump drawing fuel from a fuel storage tank. In another embodiment, the fuel supply source is an inducer drawing fuel from a fuel storage tank. In one embodiment, a duplex ball bearing arrangement is operatively associated with a drive shaft of the augmentor pump. In such an embodiment, a fluid seal is positioned between the duplex ball bearing arrangement and the augmentor pump.

In another embodiment, a journal bearing arrangement is operatively associated with a drive shaft of the augmentor pump. In such an embodiment, a fluid seal is positioned between the high speed clutch and the journal bearing arrangement. In an embodiment of the disclosure, a check valve is operatively associated with the discharge of the augmentor pump.

The subject disclosure is also directed to a fuel system for a gas turbine engine that includes an augmentor pump having an inlet communicating with a boost pump drawing fuel from a fuel storage tank and a discharge communicating with an augmentation stage of the engine. The subject disclosure is further directed to a fuel system for a gas turbine engine that includes an augmentor pump having an inlet communicating with an inducer drawing fuel from a fuel storage tank and a discharge communicating with an augmentation stage of the engine, wherein the augmentor pump is connected to an accessory drive gearbox mounted to the engine.

These and other features of the fuel system described herein will become more readily apparent to those having ordinary skill in the art to which the subject disclosure appertains from the detailed description of the preferred embodiments taken in conjunction with the following brief description of the drawings.

BRIEF DESCRIPTION OF THE DRAWINGS

So that those skilled in the art will readily understand how to make and use the fuel delivery system of the subject disclosure without undue experimentation, preferred embodiments thereof will be described in detail herein below with reference to the figures wherein.

DETAILED DESCRIPTION OF THE PREFERRED EMBODIMENTS

Figure 1:
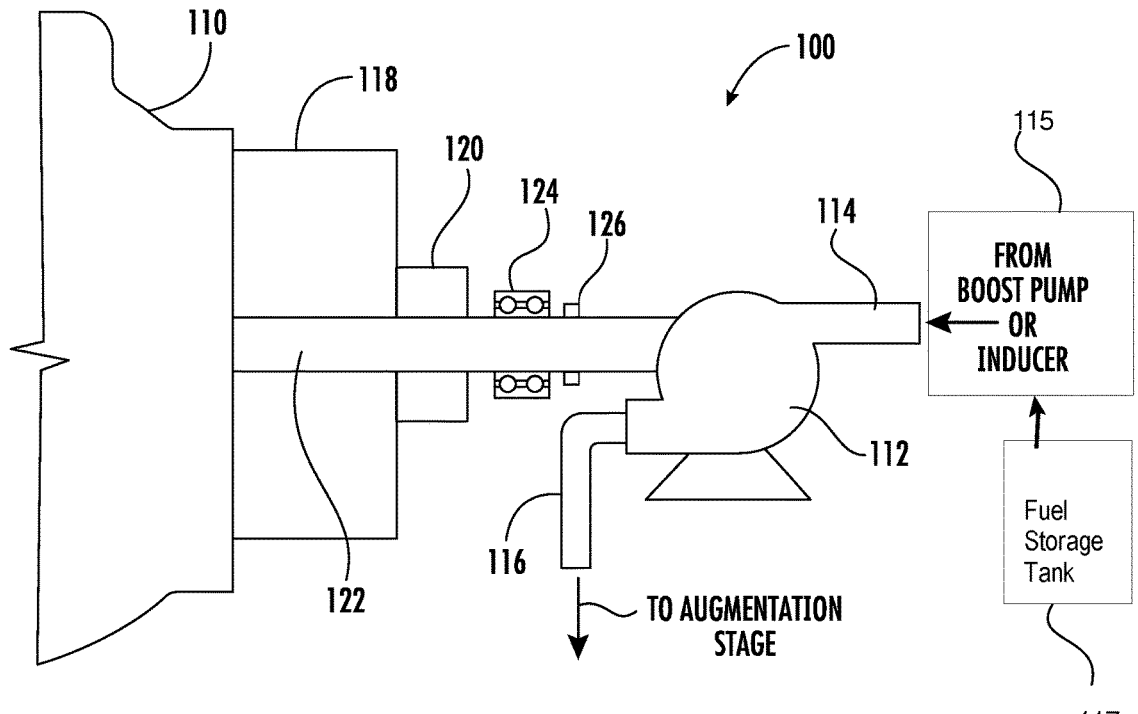
FIG. 1 is a schematic representation of an embodiment of the fuel system of the subject disclosure, which includes an augmentor pump connected to an accessory drive gearbox of a gas turbine engine by a high speed clutch, where the pump shaft is supported by a duplex ball bearing arrangement.

Referring now to the drawings wherein like reference numerals identify similar features, there is illustrated in FIG. 1 a fuel system configured in accordance with an embodiment of the subject disclosure and designated generally by reference numeral 100.

Fuel system 100 is designed for use with a gas turbine engine 110 having an augmentation stage for providing increased thrust output upon demand during flight operations. The fuel system 100 includes an augmentor pump 112 having an inlet 114 communicating with a fuel supply source and a discharge 116 communicating with the augmentation stage of the engine 110. Preferably, the augmentor pump 112 is a centrifugal pump.

In one embodiment of the invention, a boost stage pump draws fuel to the inlet 114 of the augmentor pump 112 from a fuel storage tank 117. In another embodiment of the invention, an inducer 115 associated with an impeller of the augmentor pump 112 draws fuel to the inlet 114 of the augmentor pump 112 from a fuel storage tank 117.

The augmentor pump 112 has a drive shaft 122 connected to an accessory drive gearbox 118 mounted to the engine 110. A high speed clutch 120 is operatively associated with the accessory drive gearbox 118 for selectively engaging and disengaging the drive shaft 122 of the augmentor pump 112 and the accessory drive gearbox 118. It is envisioned that the high speed clutch 120 can be electro-magnetically actuated or hydraulically actuated.

Effectively, the clutch 120 will be used to turn the augmentor pump 112 on and off. When turned off or disengaged from the engine gearbox 118, the augmentor pump impeller will stop rotating. As a result, heat generated by the pump 112 and power drawn by the pump 112 will be reduced, improving the operating efficiency of the fuel system 100.

In an embodiment of the disclosure, a check valve is located downstream from the augmentor pump 112 to assure that fuel does not back flow into the augmentor pump 112 while it is not rotating, after the clutch 120 has disengaged the drive shaft 122 from the engine gearbox 118.

A duplex ball bearing arrangement 124 is operatively associated with the drive shaft 122 of the augmentor pump 112 to support its rotation, and a fuel/oil shaft seal 126 is positioned between the duplex ball bearing arrangement 124 and the augmentor pump 112. Those skilled in the art will appreciate that when the clutch 120 is used instead of a solenoid controlled shut-off valve, as used in prior art augmentor systems, the shaft seal for the augmentor pump 112 becomes less complex, because the augmentor pump no longer needs to endure dry full speed operation. Also, the solenoids that would normally control the inlet-shut off valve is replaced by controls for the high speed clutch 120.

Furthermore, by replacing the inlet shut off-valve used in prior art augmentor systems with the clutch 120, upstream restrictions to the augmentor pump 112 are eliminated, and the inducer 115 can be readily incorporated with the impeller of the augmentor pump 112 to provide suction, drawing fuel directly from a fuel storage tank 117. This allows for a smaller main boost stage and for the augmentor pump 112 to be on its own fuel circuit. A smaller boost stage will reduce the thermal input and weight of the fuel system.

Figure 2:
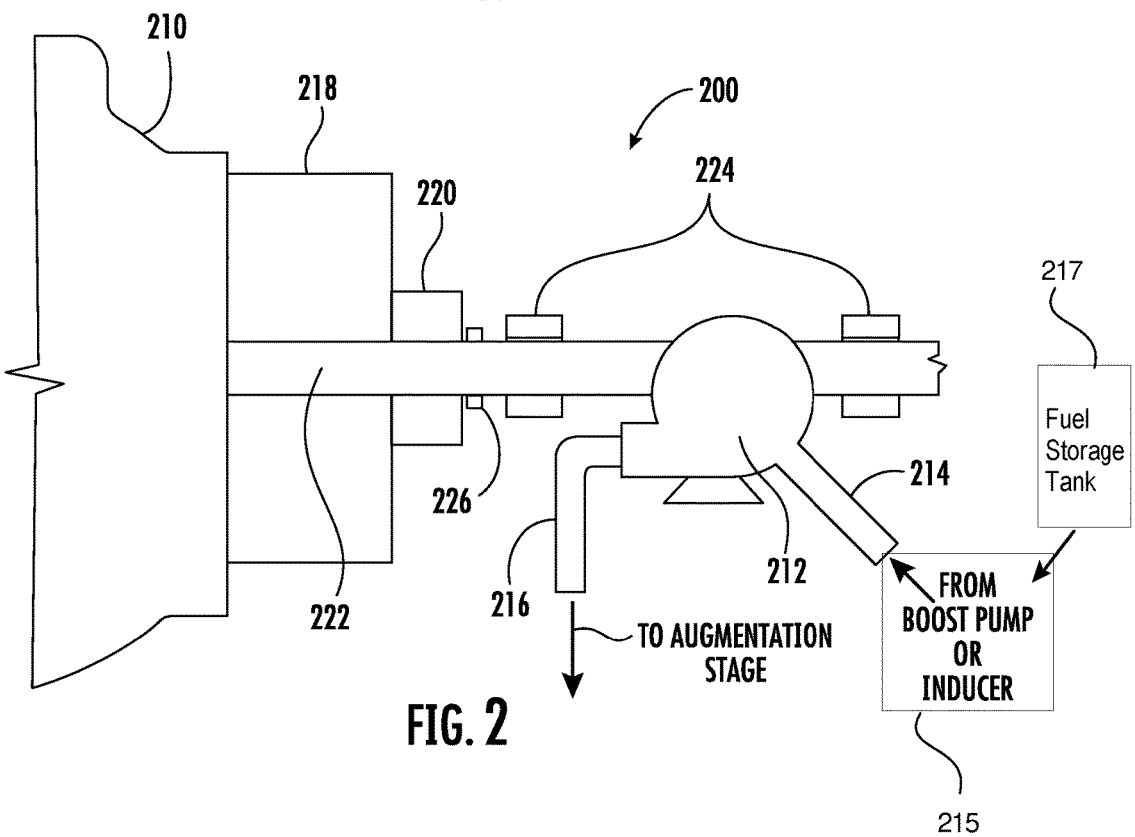
FIG. 2 is a schematic representation of another embodiment of the fuel system of the subject disclosure, which includes an augmentor pump connected to an accessory drive gearbox of a gas turbine engine by a high speed clutch, where the pump shaft is supported by a journal bearing arrangement.

Referring now to FIG. 2, there is illustrated another embodiment of a fuel system configured in accordance with an embodiment of the subject disclosure which is designated generally by reference numeral 200. Fuel system 200 is operatively associated with gas turbine engine 210, which has an augmentation stage for providing increased thrust output upon demand during flight operations. Fuel system 200 includes an augmentor pump 212 (e.g., a centrifugal pump) having an inlet 214 communicating with a fuel supply source and a discharge 216 communicating with the augmentation stage of the engine 210. As in the previous embodiment, a boost stage pump can supply fuel to the inlet 214 of the augmentor pump 212, or an inducer 215 can provide suction to supply fuel to the inlet 214 of the augmentor pump 212, drawing fuel directly from a fuel storage tank 217.

A high speed clutch 220 is operatively associated with the accessory drive gearbox 218 for selectively engaging and disengaging the drive shaft 222 of the augmentor pump 212 and the accessory drive gearbox 218. In this embodiment of the invention, a journal bearing arrangement 224 is operatively associated with the drive shaft 222 of the augmentor pump 212, and a shaft seal 226 in positioned between the high speed clutch 220 and the journal bearing arrangement 224. Because the augmentor pump 212 only rotates when wet, a light weight journal bearing arrangement can be utilized to support the pump shaft 222, instead of the oil lubricated duplex ball bearing set 124 shown in FIG. 1.

While the subject disclosure has been shown and described with reference to preferred embodiments, those skilled in the art will readily appreciate that changes and/or modifications may be made thereto without departing from the scope of the subject disclosure.

What is claimed is:

1. A fuel system for a gas turbine engine comprising:
   a) an augmentor pump having an inlet communicating with a fuel supply source and a discharge communicating with an augmentation stage of the engine, wherein the augmentor pump is connected to an accessory drive gearbox mounted to the engine along a common drive shaft, wherein the augmentor pump, the drive gearbox and the engine are all mounted on the common drive shaft; and
   b) a high speed clutch for selectively engaging and disengaging the augmentor pump and the accessory drive gearbox, wherein the high speed clutch is positioned between the augmentor pump and the drive gearbox along the common drive shaft.

2. The fuel system of claim 1, wherein the augmentor pump is a centrifugal pump.

3. The fuel system of claim 1, wherein the fuel supply source is a boost stage pump drawing fuel from a fuel storage tank.

4. The fuel system of claim 1, wherein the fuel supply source is an inducer drawing fuel from a fuel storage tank.

5. The fuel system of claim 1, wherein a duplex ball bearing arrangement is operatively associated with the common drive shaft of the augmentor pump.

6. The fuel system of claim 1, wherein a journal bearing arrangement is operatively associated with the common drive shaft of the augmentor pump.

7. The fuel system of claim 5, wherein a fluid seal is positioned between the duplex ball bearing arrangement and the augmentor pump.

8. The fuel system of claim 6, wherein a fluid seal is positioned between the high speed clutch and the journal bearing arrangement.

9. The fuel system of claim 1, wherein a check valve is operatively associated with the discharge of the augmentor pump.

10. The fuel system of claim 1, wherein the high speed clutch is electro-magnetically actuated or hydraulically actuated.

11. A fuel system for a gas turbine engine comprising:
    a) an augmentor pump having an inlet communicating with a boost pump drawing fuel from a fuel storage tank and a discharge communicating with an augmentation stage of the engine, wherein the augmentor pump is connected to an accessory drive gearbox mounted to the engine along a common drive shaft, wherein the augmentor pump, the drive gearbox and the engine are all mounted on the common drive shaft; and
    b) a high speed clutch for selectively engaging and disengaging the augmentor pump and the accessory drive gearbox, wherein the high speed clutch is positioned between the augmentor pump and the drive gearbox along the common drive shaft.

12. The fuel system of claim 11, wherein the augmentor pump is a centrifugal pump.

13. The fuel system of claim 11, wherein a duplex ball bearing arrangement is operatively associated with the common drive shaft of the augmentor pump and a fluid seal is positioned between the duplex ball bearing arrangement and the augmentor pump.

14. The fuel system of claim 11, wherein a journal bearing arrangement is operatively associated with the common drive shaft of the augmentor pump and a fluid seal is positioned between the high speed clutch and the journal bearing arrangement.

15. The fuel system of claim 11, wherein a check valve is operatively associated with the discharge of the augmentor pump.

16. A fuel system for a gas turbine engine comprising:
   a) an augmentor pump having an inlet communicating with an inducer drawing fuel from a fuel storage tank and a discharge communicating with an augmentation stage of the engine, wherein the augmentor pump is connected to an accessory drive gearbox mounted to the engine along a common drive shaft, wherein the augmentor pump, the drive gearbox and the engine are all mounted on the common drive shaft; and
   b) a high speed clutch for selectively engaging and disengaging the augmentor pump and the accessory drive gearbox, wherein the high speed clutch is positioned between the augmentor pump and the drive gearbox along the common drive shaft.

17. The fuel system of claim 16, wherein the augmentor pump is a centrifugal pump.

18. The fuel system of claim 16, wherein a duplex ball bearing arrangement is operatively associated with the augmentor pump and a fluid seal is positioned between the duplex ball bearing arrangement and the augmentor pump.

19. The fuel system of claim 16, wherein a journal bearing arrangement is operatively associated with the augmentor pump and a fluid seal is positioned between the high speed clutch and the journal bearing arrangement.

20. The fuel system of claim 16, wherein a check valve is operatively associated with the discharge of the augmentor pump.

\* \* \* \* \*